United States Patent
Campbell et al.

(10) Patent No.: US 9,646,436 B1
(45) Date of Patent: May 9, 2017

(54) GESTURE CONTROLS FOR REMOTE VEHICLE ACCESS SYSTEMS

(71) Applicant: Huf North America Automotive Parts Manufacturing, Corp., Farmington Hills, MI (US)

(72) Inventors: Robert J. Campbell, Farmington, MI (US); Yipeng Tang, Troy, MI (US); Mansour Ashtiani, Novi, MI (US); Khalid Kamal, Novi, MI (US); Lynn D Da Deppo, Bloomfield Hills, MI (US)

(73) Assignee: Huf North America Automotive Parts Manufacturing, Corp., Milwaukee, WI (US)

( * ) Notice: Subject to any disclaimer, the term of this patent is extended or adjusted under 35 U.S.C. 154(b) by 0 days.

(21) Appl. No.: 14/585,997

(22) Filed: Dec. 30, 2014

Related U.S. Application Data

(60) Provisional application No. 61/922,411, filed on Dec. 31, 2013.

(51) Int. Cl.
*G07C 9/00* (2006.01)

(52) U.S. Cl.
CPC ........ *G07C 9/00111* (2013.01); *G07C 2009/00365* (2013.01)

(58) Field of Classification Search
CPC ......... G07C 2009/00317; G07C 2009/00325; G07C 2009/00333; G07C 2009/00341; G07C 2009/00349; G07C 2009/00357; G07C 2009/00365; G07C 2009/0038; G07C 2009/00555; G07C 2009/00579; G07C 2009/00587; G07C 2009/00595; G07C 2009/00571
See application file for complete search history.

(56) References Cited

U.S. PATENT DOCUMENTS

| | | | | |
|---|---|---|---|---|
| 4,410,843 A | * | 10/1983 | Sauer | B60J 1/17 219/203 |
| 6,094,981 A | * | 8/2000 | Hochstein | B32B 17/10036 73/170.17 |
| 6,933,831 B2 | * | 8/2005 | Ieda | B60R 25/246 340/426.1 |
| 6,972,575 B2 | * | 12/2005 | Lambert | H03K 17/955 318/264 |
| 7,342,373 B2 | * | 3/2008 | Newman | B60H 1/00735 318/280 |
| 7,548,809 B2 | * | 6/2009 | Westerhoff | E05F 15/46 318/453 |
| 8,049,451 B2 | * | 11/2011 | Patterson | G01V 3/088 318/264 |

(Continued)

*Primary Examiner* — Brian Miller
(74) *Attorney, Agent, or Firm* — Honigman Miller Schwartz and Cohn LLP; Matthew H. Szalach; Jonathan P. O'Brien

(57) ABSTRACT

A method and apparatus for hands-free activation of vehicle functions such as accessing doors and windows, and establishing driver preferences such as seat positions is disclosed. A capacitive sensor is embedded in a non-metallic portion of the vehicle such as a tail light, window, or cladding on the vehicle. The capacitive sensor is in communication with a vehicle control unit, which can detect the proximity of a user or a specific gesture to activate a predetermined vehicle function.

24 Claims, 2 Drawing Sheets

(56) References Cited

U.S. PATENT DOCUMENTS

| | | | | |
|---|---|---|---|---|
| 8,091,280 B2 * | 1/2012 | Hanzel | B60R 25/2054 | 296/146.4 |
| 8,098,130 B2 * | 1/2012 | Baruco | B60R 25/245 | 340/426.36 |
| 8,283,800 B2 * | 10/2012 | Salter | E05F 15/73 | 307/9.1 |
| 8,319,605 B2 * | 11/2012 | Hassan | G01C 17/38 | 340/10.2 |
| 8,766,657 B2 * | 7/2014 | DeJean | H03K 17/955 | 324/519 |
| 8,994,495 B2 * | 3/2015 | Dassanayake | G07C 9/00174 | 340/3.1 |
| 9,002,584 B2 * | 4/2015 | Van Wiemeersch | E05F 15/0008 | 345/633 |
| 9,050,779 B2 * | 6/2015 | Derda | B32B 17/10 | |
| 9,068,390 B2 * | 6/2015 | Ihlenburg | E05F 15/203 | |
| 2001/0052839 A1 * | 12/2001 | Nahata | E05B 81/78 | 340/5.72 |
| 2007/0276550 A1 * | 11/2007 | Desai | B60R 25/23 | 701/1 |
| 2008/0265913 A1 * | 10/2008 | Netzer | B60S 1/0822 | 324/669 |
| 2009/0091477 A1 * | 4/2009 | McCall | G01S 19/42 | 340/990 |
| 2011/0043325 A1 * | 2/2011 | Newman | E05F 15/46 | 340/5.2 |
| 2012/0200388 A1 * | 8/2012 | Miura | H03K 17/962 | 340/5.51 |
| 2012/0268242 A1 * | 10/2012 | Tieman | B60R 25/24 | 340/5.61 |
| 2014/0156112 A1 * | 6/2014 | Lee | G08C 17/00 | 701/2 |
| 2014/0293753 A1 * | 10/2014 | Pearson | G08C 23/02 | 367/197 |
| 2015/0116079 A1 * | 4/2015 | Mishra | G07C 9/00007 | 340/5.52 |
| 2015/0291126 A1 * | 10/2015 | Nicholls | B60R 25/20 | 701/49 |
| 2016/0083995 A1 * | 3/2016 | Dezorzi | E05F 15/73 | 340/5.72 |

* cited by examiner

GESTURE CONTROLS FOR REMOTE VEHICLE ACCESS SYSTEMS

CROSS-REFERENCE TO RELATED APPLICATIONS

This application claims the benefit of U.S. Provisional Patent Application No. 61/922,411 filed Dec. 31, 2013, which is hereby incorporated by reference in its entirety.

BACKGROUND OF THE INVENTION

In recent years, wireless communications have become increasingly important in a number of vehicle control systems. Remote vehicle entry transmitters/receivers, for example, are used for locking and unlocking a vehicle door, unlatching a trunk latch, starting the vehicle, or activating or deactivating an alarm system equipped on the vehicle. This remote entry device is commonly referred to a remote keyless entry (RKE) fob. The RKE fob is typically a small rectangular or oval plastic housing with a plurality of depressible buttons for activating each one of the wireless operations. The RKE fob is carried with the operator of a vehicle and can wirelessly perform these functions when within a predetermined reception range of the vehicle. The RKE fob communicates with an electronic control module within the vehicle via a RF communication signal.

Even more recently, complex embedded electronic systems have become common to provide access and start functions, and to provide wide ranging functions to improve driver safety and convenience. These systems include Passive Entry and Passive Start (PEPS) systems which include a remote receiver and transmitter (or transceiver) and an electronic control module disposed within the vehicle. In a PEPS system, a remote transceiver is carried with the user in a portable communication device such as a key fob or a card. The portable communication device when successfully challenged transmits a radio frequency (RF) signal to a PEPS module within the vehicle which starts the authentication process to validate the user. The PEPS module in turn sends status information on a system vehicle bus to other vehicle control modules which perform a variety of tasks such door lock/unlock, enabling engine start, or activating external/internal lighting.

In addition to keyless and passive entry systems, "gesture recognition" has become important for accessing vehicles. Capacitive sensors include a sensor electrode or multiple electrodes which can detect an object in a "detection area" space in front of the sensor electrode(s). In one type of system, for example, a control and evaluation circuit is coupled to the sensor electrode and detects a change in the capacitance of the sensor electrode with respect to a reference potential. These sensors can be coupled to a non-metallic portion of the vehicle, such as the region of a lower sill area, lower fender or bumper, and are typically used to operate (open/close) a door of a motor vehicle, a trunk, or a tailgate by detecting the approach of a body part, e.g. a pivoting movement of a leg/foot under the bumper and forward it in a command to open or close the trunk or tailgate to a control device in the motor vehicle. The "gesture sensor" can, in some applications, be combined and monitored in conjunction with the proximity of a key fob or PEPS device to assure that the person providing the "gesture" also has the right to access the vehicle.

While capacitive gesture sensors are very helpful to vehicle users to simplify the opening and closing of doors and other access points, because they must be embedded in non-metallic portions of the vehicle, the sensors often cannot be positioned in locations where they can be easily accessed by gestures provided by the user. The sensors, for example, are often embedded in the non-metallic trim areas of the vehicle such as the bumper, lower fender or sill. These locations are often suitable on passenger vehicles, but are typically too high for proper access for a pick-up truck tailgate. Moreover, the positions of the sensors is often adjacent significant amounts of metallic content, which can interfere with recognition of motion. These areas are also subject to environmental problems, such as mud and ice build-up. Known sensors, therefore, can be difficult to access, particularly for car owners and users that are carrying heavy loads. The present disclosure addresses these and other issues.

SUMMARY OF THE INVENTION

The present disclosure provides a wireless communications system for an automotive vehicle that comprises a control unit in the automotive vehicle including a transceiver configured to receive signals from a fob, a fob comprising a transceiver and a control unit and a capacitive sensor embedded in a non-metallic portion of the vehicle. The fob is configured to identify an authorized user adjacent the vehicle and the capacitive sensor is in communications with the control unit. The control unit is programmed to identify an authorized user based on transmissions from the fob, to drive the capacitive sensor and monitor the sensor for a change in capacitance indicative of proximity of the authorized user, and provide access to a predetermined vehicle function when the authorized user is identified and also proximate the capacitive sensor.

In other aspect of the disclosure, the non-metallic portion of the vehicle comprises a tail light. Alternatively, the non-metallic portion of the vehicle comprises at least one of a head lamp, a glazing in the vehicle window, a cladding on the vehicle, and an appliqué mounted on the vehicle. The non-metallic portion can be advantageously position higher than the bumper of the vehicle.

In other aspects of the disclosure, the vehicle function activated by the capacitive sensor can comprise at least one of unlocking one or more of the doors or windows of the vehicle; activating at least one of external and internal vehicle lighting; activating a vehicle camera; adjusting a driver preference; and activating an electrical system.

In still other aspects, the control unit can be programmed to identify a gesture made by the authorized user to enable access to the vehicle function. The key fob can be correlated with a user-selected gesture.

In another aspect of the disclosure, a motor vehicle is provided. The motor vehicle, comprises a vehicle body comprising at least one non-metallic surface, a control unit mounted inside the vehicle body, and a capacitive sensor mounted to the non-metallic surface in the vehicle body and in communication with the control unit. The control unit is programmed to drive the capacitive sensor and monitor the capacitive sensor for a change in capacitance indicative of proximity of the authorized user, and to provide access to a predetermined vehicle function when the authorized user is proximate the capacitive sensor. In another aspect of the invention, the control unit can be in communication with a fob that is adapted to be carried by the authorized user, and the control unit is further programmed to identify an authorized user based on transmissions from the fob.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
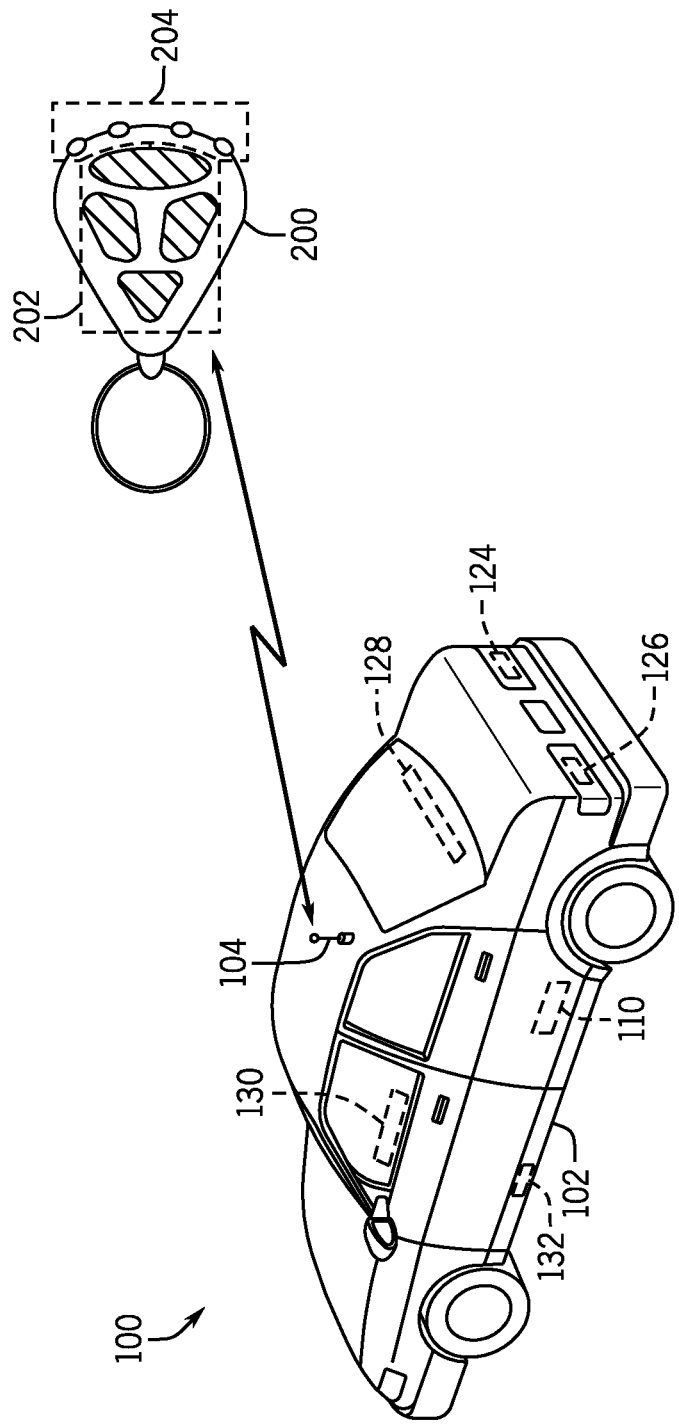
FIG. 1 illustrates a wireless vehicle communication system including a vehicle, vehicle transceiver module, an antenna communicating with a mobile electronic user device, and various capacitive sensors embedded in the vehicle for detecting a user.

Referring to FIG. 1, a wireless vehicle communication system 100 is shown. The system 100 comprises a vehicle 102 including a vehicle transceiver module 110 having an antenna 104 communicating with a mobile electronic user device 200, which here is shown and described as a key fob. It will be apparent that the mobile electronic user device 200 can be many types of application-specific or personal computerized devices, including, for examples, transponder cards, personal digital assistants, tablets, cellular phones, and smart phones. Communications are typically described below as bi-directional between the vehicle transceiver module and the key fob 200 and other devices, although it will be apparent that in many applications one way communications will be sufficient.

Referring still to FIG. 1, one or more capacitive gesture sensors can be embedded in the vehicle. As shown here, sensors 124 and 126 are embedded in the back tail lights. Sensors 128 and 130 are embedded in the glazing adjacent the window, and can be provided in the side glass, rear, or windshield. Sensor 132 is embedded behind cladding along a bottom edge of the vehicle 102, or in an appliqué that is attached to the vehicle. Each of these capacitive sensors 124, 126, 128, 130, and 132 is therefore positioned to provide higher access points for a user to provide gesture control, and is provided adjacent a non-conductive portion of the vehicle.

Referring still to FIG. 1, the key fob 200 can include one or more user input device 202 and one or more user output or alert devices 204. The user input devices 202 are typically switches such as buttons that are depressed by the user. The user output alert devices 204 can be one or more visual alert, such as light emitting diodes (LEDs), a liquid crystal display (LCD), and audible alarm, or a tactile or vibratory device. A single function can be assigned to each input device 202 or user alert devices 204, or a combination of input devices or a display menu could be used to request a plethora of functions via input device sequences or combinations. Key fobs can, for example, provide commands to start the vehicle, provide passive entry (i.e., automatic unlocking of the doors of the vehicle 102 when key fob 200 is within a predetermined proximate distance of the vehicle 102), activate external and internal vehicle lighting, preparation of the vehicle locking system, activation of a vehicle camera for vehicle action in response to camera-detected events, opening windows, activating internal electric devices, such as radios, telephones, and other devices, and adjustment of driver preferences (e.g., the position of the driver's seat and the tilt of the steering wheel) in response to recognition of the key fob 200. These functions can be activated input devices 202 or automatically by the vehicle 102 detecting the key fob 200. Although a single key fob is shown here, it will be apparent that any number of key fobs could be in communication with the vehicle transceiver module, and the vehicle transceiver module 110 and corresponding control system could associate a different set of parameters with each key fob.

In addition, the vehicle transceiver module 110 can activate output or alert devices 204 to notify the vehicle user that the key fob 200 is within communication distance or some other predetermined distance of the vehicle 102; notify the vehicle user that a vehicle event has occurred (e.g., activation of the vehicle security system), confirm that an instruction has been received from the key fobs 200, or that an action initiated by key fob 200 has been completed.

Figure 2:
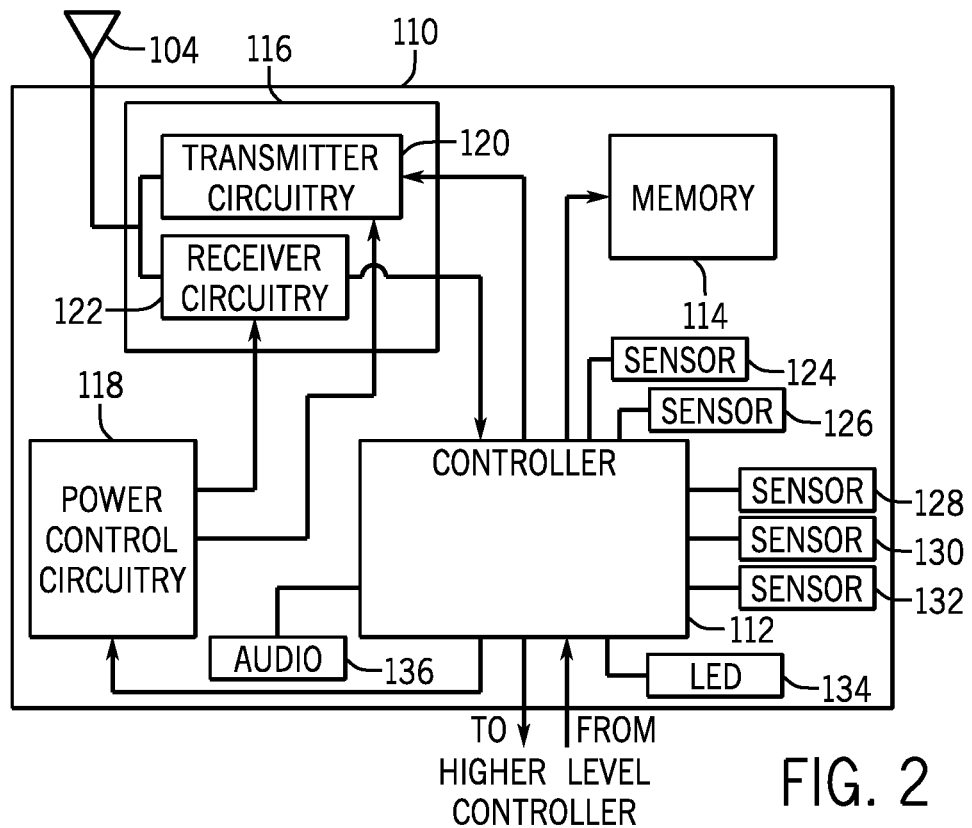
FIG. 2 is a block diagram of an exemplary vehicle transceiver module that can be used in accordance with the disclosed system.

Referring now to FIG. 2, a block diagram of an exemplary vehicle transceiver module 110 that can be used in accordance with the disclosed system is illustrated. The vehicle transceiver module 110 includes a processor or controller 112, memory 114, a power supply 118, and transceiver circuitry 116 communicating through the antenna 104.

The transceiver circuitry 110 includes receiver circuitry 122 and transmitter circuitry 120 for bi-directional communications. The receiver circuitry 122 demodulates and decodes received RF signals from the key fob 200, while the transmitter provides RF codes to the key fob 200, as described below. Although a bi-directional transceiver 110 is shown, it will be apparent that one way communications from the key fob 200 to the vehicle 102, or from the vehicle to the key fob 200 can also be provided, and that both a transmitter and receiver would not be required.

The memory 114 stores data and operational information for use by the processor 112 to perform the functions of the vehicle transceiver module 110, and to provide the vehicle function(s) described above. The controller 112 is also coupled to a higher level vehicle controller or controllers (not shown), which can include, for example, a vehicle bus such as a Controller Area Network (CAN) bus system and corresponding vehicle control system, and can both receive command signals from the vehicle control system and provide command signals and other information to the vehicle control system. Information available to other devices from the CAN bus or other online vehicle bus may include, for example, vehicle status information regarding vehicle systems, such as ignition status, odometer status (distance traveled reading), wheel rotation data (e.g., extent of wheel rotation), etc. Vehicle status data can also include status of electronic control systems including among others, Supplemental Restraint Systems (SRS), Antilock Braking Systems (ABS), Traction Control Systems (TCS), Global Positioning Systems (GPS), Environmental monitoring and control Systems, Engine Control Systems, cellular, Personal Communications System (PCS), and satellite based communication systems and many others not specifically mentioned here.

The transceiver 110 is coupled to the antenna 104 for receiving radio frequency (RF) signals from the key fob 200 and transmitting signals to the key fob 200. Although the antenna 104 is shown as being external to the vehicle transceiver module 110 and on the exterior of the vehicle 102, the antenna 104 may also be implemented within the confines of the vehicle 120 or even within the vehicle transceiver module. A number of antennas can be embedded, for example, in the headliner of a vehicle, or elsewhere within a vehicle. Although a bi-directional transceiver 110 is shown, it will be apparent that one way communications from the key fob 200 to the vehicle 102, or from the vehicle to the key fob 200 can also be provided, and that both a transmitter and receiver would not be required.

Referring still to FIG. 2, the capacitive sensors 124, 126, 128, 130, 132 are electrically connected to the controller 112 which periodically couples a sensor electrode to an operating voltage at a predefined frequency and evaluates at least one of a current or voltage profile to detect a change in the capacitance of the sensor electrode with respect to ground. The current or voltage profile depends on the charge accumulated by the sensor electrode during periodic charging cycles in which the sensor electrode is coupled to the operating voltage and then discharged by the capacitor. Circuits of this type are shown, for example, in U.S. Pat. No. 5,730,165, which is hereby incorporated by reference for its description of such a device.

Alternatively, the capacitive sensors can include a sensor electrode, a ground electrode, and a guard electrode. The ground electrode is arranged behind the sensor electrode, and the guard electrode, is arranged between the sensor electrode and the ground electrode. The guard electrode is coupled to the sensor electrode by the controller 112 in such a manner that its potential tracks the potential of the sensor electrode. These types of sensors are described, for example, in U.S. Pat. No. 6,825,752 B2, which is hereby incorporated by reference for its description of such a device. Here, the guard electrode provides increased sensitivity of the capacitive sensor in the space in front of the sensor electrode because the field emanating from the sensor electrode extends a greater distance in the detection region of the sensor electrode because a significant portion of the field for the background electrode is no longer short-circuited, as compared to the capacitive sensor without a guard electrode, described above.

Referring still to FIG. 2, a gesture identifier, such as a light 134 or audio output 136 can be driven by the controller 112 when a gesture is detected. The light 134 can, for example, be an LED, OLED or other type of lighting element that is embedded adjacent the corresponding capacitive sensor. A light, for example, can be useful for use with capacitive sensors 124 and 126 embedded in the tail lights. The tail light itself could also be activated when a gesture is detected. Audio output can be correlated with specific sensors to provide different frequencies, tunes, or other audio variations depending on the access point.

Figure 3:
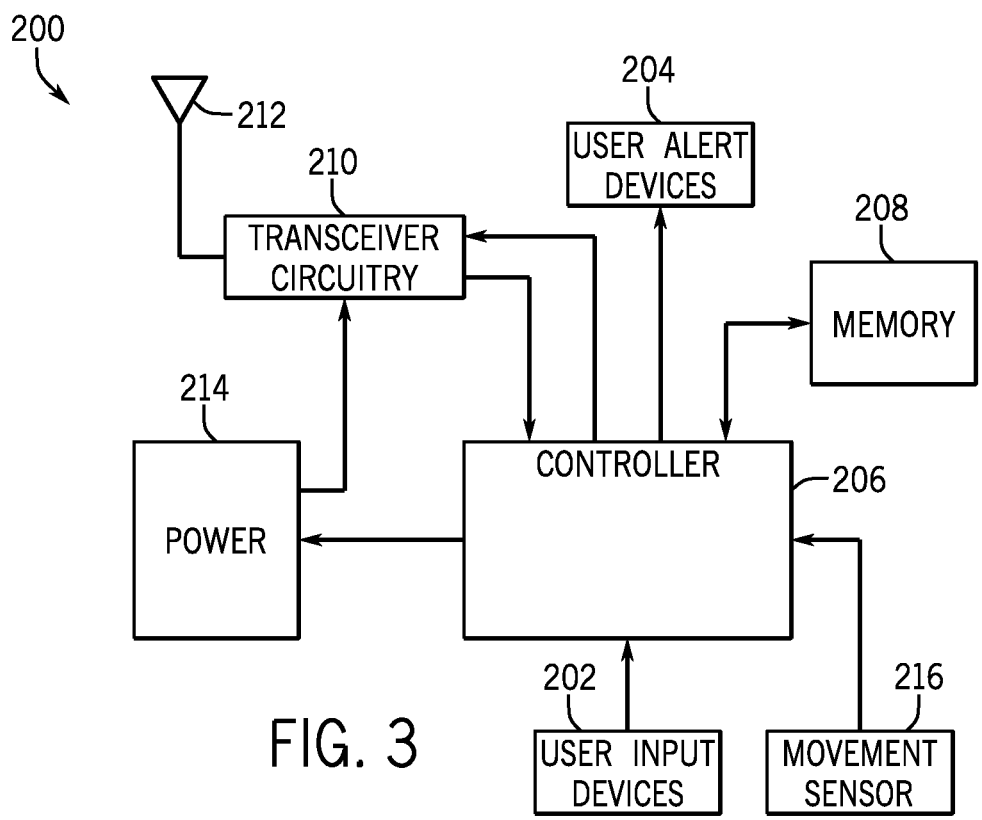
FIG. 3 is a block diagram of an exemplary key fob that can be used in accordance with the disclosed system.

Referring now to FIG. 3, a block diagram of an exemplary key fob 200 that can be used in accordance with the disclosed system includes a controller 206, memory 208, transceiver 210 and corresponding antenna 212, and a power supply 214 (such as a battery). User input devices 202 and user alert devices 204 are in communication with the controller 206. The transceiver circuitry 210 includes receiver circuitry and transmitter circuitry, the receiver circuitry demodulating and decoding received RF signals to derive information and to provide the information to the controller or processor 206 to provide functions requested from the key fob 200. The transmitter circuitry encodes and modulating information from the processor 206 into RF signals for transmission via the antenna 212 to the vehicle transceiver 110.

Although many different types of communications systems could be used, conventional vehicles typically utilize four short-range RF based peer-to-peer wireless systems, including Remote Keyless Entry (RKE), Passive Keyless Entry (PKE), Immobilizer and Tire Pressure Monitoring System (TPMS). RKE and TPMS typically use the same high frequency with different signal modulation (315 MHz for US/NA, 433.32 MHz for Japan and 868 MHz for Europe), whereas the PIKE system often requires a bidirectional communication at a low frequency (125 KHz) between the key fob and the receiver module and a unidirectional high frequency communication from key fob to the receiver module. The Immobilizer system also typically uses a low frequency bidirectional communication between the key fob and the receiver module. Receivers for these systems are often standalone and/or reside in various control modules like Body Control Module (BCM) or Smart Junction Block (SJB). By using different radios with different carrier frequencies and/or modulation schemes, collisions between transmissions from separate wireless communication systems in the vehicles can be avoided.

The antenna 212 located within the fob 200 may be configured to transmit long-range ultra-high frequency (UHF) signals to the antenna 104 of the vehicle 100 and receive short-range Low Frequency (LF) signals from the antenna 104. However, separate antennas may also be included within the fob 200 to transmit the UHF signal and receive the LF signal. In addition, antenna 104 and other antennas in the vehicle may be configured to transmit LF signals to the fob 200 and receive UHF signals from the antenna 212 of the fob 200. Also, separate antennas may be included within the vehicle 102 to transmit LF signals to the fob 200 and receive the UHF signal from the fob 200.

The fob 200 may also be configured so that the fob controller 206 may be capable of switching between one or more UHF channels. As such, the fob controller 206 may be capable of transmitting a response signal across multiple UHF channels. By transmitting the response signal across multiple UHF channels, the fob controller 206 may ensure accurate communication between the fob 200 and the vehicle transceiver 110.

Referring still to FIG. 3, a motion detection device, such as a movement sensor 216, can optionally be included in the key fob 200 to detect movement of the key fob 200. The controller 206 can, for example, utilize the motion or lack of motion detected signal from the movement sensor 216 to place the key fob 200 in a sleep mode when no motion is detected for a predetermined time period. The predetermined time period during which no motion is detected that could trigger the sleep mode could be a predetermined period of time or a software configurable value. Although the motion detection device is here shown as part of the key fob, a motion detection device could additionally or alternatively be provided in the vehicle 102.

The vehicle transceiver 110 may transmit one or more signals without an operator activating a switch or pushbutton on the fob key 200, including a wakeup signal intended to activate a corresponding fob 200. The fob 200 may receive signals from the transceiver 110 and determine the strength or intensity of the signals (Received Signal Strength Indication (RSSI)), which can be used to determine a location of the fob 200.

In operation, a user approaches vehicle 102. The user can actively identify him or herself as an authorized user of the vehicle either by activating a key on the key fob 200, or passively through a PEPS system corresponding to the fob 200, as described above. When the controller 112 identifies an authorized user adjacent the vehicle, the controller 112 can activate the capacitive sensors 124, 126, 128, 130, and 132. The controller 112 then monitors the detection area adjacent the capacitive sensors for proximity of the user, or gestures indicating that the authorized user intends to access the vehicle access point controlled by the corresponding sensor. As described above, the controller 112 can activate lights 124 or audio 126 indicating that the sensors have been activated.

Various activities can be used to trigger the capacitive sensors. The vehicle controller 112 can be programmed to identify the key fob and a proximity of the user, specific gestures, and predefined movements toward and away from the vehicle. In addition, one or more of the sensors can identify a location or position of the user relative the vehicle for purposes of identifying doors, windows, tailgates or other access point to be enabled when the user approaches. In some applications, the identity of a user and corresponding proximity can be used to activate a predetermined set of vehicle functions. For example, when a user is identified approaching the drivers side of the vehicle, the vehicle controller can enable the driver side door and window, and adjust the mirrors and drivers seat to predetermined positions. When approaching the passenger side, only the door, window, and seat are adjusted. The vehicle controller could also establish communications through the identified user's cell phone and Bluetooth devices, and/or set specific radio stations The gesture necessary to activate various sets of vehicle functions can also be varied. For example, a first user may choose a foot lifting gesture opening of the doors, while another user may choose a hand wave. The selected gestures can be correlated with the personal key fobs for users, thereby enabling different gestures to be selected. Therefore, a user with a problematic knee may choose to use a hand wave, while one with carpal tunnel syndrome may select a hand wave. The correlation could, for example, be programmed into the key fob corresponding to the authorized user, or in memory associated with the vehicle control unit.

Although specific embodiments are described above, it will be apparent to those of ordinary skill in the art that a number of variations can be made within the scope of the disclosure It should be understood, therefore, that the methods and apparatuses described above are only exemplary and do not limit the scope of the invention, and that various modifications could be made by those skilled in the art that would fall within the scope of the invention. To apprise the public of the scope of this invention, the following claims are made:

We claim:

1. A wireless communications system for an automotive vehicle comprising:
   a first control unit in the automotive vehicle including a transceiver configured to receive signals from a fob;
   a fob comprising a transceiver, a motion detection device, and a second control unit, the fob configured to identify an authorized user adjacent the vehicle, the motion detection device configured to detect a movement of the fob; and
   a capacitive sensor embedded in a non-metallic portion of the vehicle and in communication with the first control unit, wherein the first control unit is programmed to identify an authorized user based on transmissions from the fob, and to activate the capacitive sensor prior to monitoring the sensor for a change in capacitance indicative of proximity of the authorized user, and provide access to a predetermined vehicle function when the authorized user is identified and also proximate the capacitive sensor.

2. The wireless communications system of claim 1, wherein the non-metallic portion of the vehicle comprises a tail light.

3. The wireless communications system of claim 1, wherein the non-metallic portion of the vehicle comprises at least one of a head lamp, a glazing in a window of the vehicle, a cladding on the vehicle, and an appliqué mounted on the vehicle.

4. The wireless communications system of claim 1, wherein the vehicle function comprises at least one of locking or unlocking one or more doors of the vehicle.

5. The wireless communications system of claim 1, wherein the vehicle function comprises at least one of locking, unlocking, opening, or closing one or more windows of the vehicle.

6. The wireless communications system of claim 1, wherein the vehicle function comprises activating at least one of external and internal vehicle lighting.

7. The wireless communications system of claim 1, wherein the vehicle function comprises activating a vehicle camera.

8. The wireless communications system of claim 1, wherein the vehicle function comprises adjusting a driver preference.

9. The wireless communications system of claim 1, wherein the vehicle function comprises activating an electrical system.

10. The wireless communications system of claim 1, wherein the first control unit is further programmed to identify a gesture made by the authorized user to enable access to the vehicle function.

11. The wireless communications system of claim 1, wherein the non-metallic portion of the vehicle is in a position higher than a bumper of the vehicle.

12. The wireless communications system of claim 1, wherein the key fob is correlated with a user-selected gesture.

13. The wireless communications system of claim 1, wherein the vehicle function comprises unlocking a door of the vehicle only when the authorized user approaches the door.

14. The wireless communications system of claim 1, wherein the second control unit is operable to place the fob in a sleep mode when no movement of the fob is detected by the motion detection device within a predetermined time period.

15. A motor vehicle, comprising:
   a vehicle body comprising at least one non-metallic surface;
   a control unit mounted inside the vehicle body;
   a capacitive sensor mounted to the non-metallic surface in the vehicle body and in communication with the control unit, the control unit being programmed to activate the capacitive sensor prior to monitoring the capacitive sensor for a change in capacitance indicative of proximity of an authorized user, and to provide access to a predetermined vehicle function when the authorized user is proximate the capacitive sensor; and
   a motion detection device configured to detect movement of a fob.

16. The motor vehicle of claim 15, wherein the control unit is in communication with the fob and is programmed to identify the authorized user based on transmissions from the fob.

17. The motor vehicle of claim 15, wherein the non-metallic surface of the vehicle comprises a tail light.

18. The motor vehicle of claim 15, wherein the control unit is further programmed to identify a gesture made by the authorized user to enable access to the vehicle function.

19. The motor vehicle of claim 15, wherein the vehicle function comprises unlocking a door.

20. The motor vehicle of claim 15, wherein the non-metallic surface of the vehicle comprises at least one of a tail light, a head lamp, a glazing in a vehicle window, a cladding on the vehicle, and an appliqué mounted on the body of the vehicle.

21. The motor vehicle of claim 15, wherein the vehicle function comprises adjusting a driver preference.

22. A wireless communications system for an automotive vehicle, the wireless communication system comprising:
   a fob comprising a transceiver and a first control unit, the fob configured to identify an authorized user adjacent the vehicle;
   a second control unit in the automotive vehicle including a transceiver configured to receive signals from the fob; and
   a capacitive sensor embedded in a non-metallic portion of the automotive vehicle and in communication with the second control unit, wherein the second control unit is programmed to (i) identify an authorized user based on transmissions from the fob, and to (ii) activate the capacitive sensor prior to monitoring the capacitive sensor for a change in capacitance indicative of proximity of the authorized user, and to (iii) provide access to a predetermined vehicle function when the authorized user is identified and also proximate the capacitive sensor.

23. The wireless communications system of claim 22, wherein the fob includes a motion detection device configured to detect movement of the fob.

24. The wireless communications system of claim 23, wherein the first control unit is operable to place the fob in a sleep mode when no movement of the fob is detected by the motion detection device within a predetermined time period.

* * * * *